United States Patent [19]

Reinke et al.

[11] Patent Number: 5,125,254

[45] Date of Patent: Jun. 30, 1992

[54] APPARATUS FOR FORMING A VERY OPEN SHELL FOR LATERAL LOADING OF PRODUCT

[75] Inventors: Stephen M. Reinke, Rochester; Robert F. Allen, Spencerport; Paul E. Bailey, Caledonia; Thomas A. Cipolla, Rochester; James C. Foote, Jr., York; Robert L. Huseby, Fairport, all of N.Y.; Thomas E. Stark, North Fort Myers, Fla.

[73] Assignee: Eastman Kodak Company, Rochester, N.Y.

[21] Appl. No.: 622,989

[22] Filed: Dec. 6, 1990

[51] Int. Cl.⁵ .......................... B21D 5/04; B21D 51/28
[52] U.S. Cl. .................................. 72/306; 72/217; 72/379.4; 72/426; 29/806; 413/71; 413/76
[58] Field of Search ................. 72/321, 322, 149, 125, 72/122, 208, 217, 215, 379.4, 306, 426; 29/806, 430; 413/76, 71, 70, 69

[56] References Cited

U.S. PATENT DOCUMENTS

| 382,537 | 5/1888 | Leavitt | 413/76 |
|---|---|---|---|
| 478,090 | 7/1892 | Crowell | 72/322 |
| 1,209,415 | 12/1916 | Duncan | 72/217 |
| 1,531,813 | 3/1925 | Post | 72/322 |
| 2,184,089 | 12/1939 | Achtermann | 413/71 |
| 2,476,996 | 7/1949 | Nebel | 242/71 |
| 2,940,232 | 6/1960 | Wallace et al. | 53/112 |
| 3,466,845 | 2/1966 | Beekes et al. | 53/194 |
| 3,586,258 | 6/1971 | Horlezerder | 242/197 |
| 3,603,220 | 9/1971 | Myers | 93/77 |
| 3,879,994 | 4/1975 | Hune | 72/149 |
| 3,945,584 | 3/1976 | Mangan | 242/71.1 |
| 4,080,711 | 3/1978 | Kawada et al. | 29/427 |
| 4,115,913 | 9/1978 | Moriya et al. | 29/450 |
| 4,180,905 | 1/1980 | Klinkhammer et al. | 29/786 |
| 4,223,852 | 9/1980 | Neuhold | 242/71.1 |
| 4,349,345 | 9/1982 | Bodendoerfer | 493/295 |
| 4,614,019 | 9/1986 | Shimizu et al. | 29/450 |
| 4,656,737 | 4/1987 | Shimizu et al. | 29/806 |
| 4,891,089 | 1/1990 | Takahashi | 29/806 |
| 4,974,316 | 12/1990 | Suzuki | 29/806 |

FOREIGN PATENT DOCUMENTS

| 0278483 | 8/1988 | European Pat. Off. |  |
| 471534 | 2/1929 | Fed. Rep. of Germany | 413/69 |
| 55-77949 | 12/1980 | Japan. |  |

Primary Examiner—Daniel C. Crane
Attorney, Agent, or Firm—Charles E. Snee, III

[57] ABSTRACT

A substantially rectangular metal blank is formed about a mandrel (76) to provide a very open shell (28) having a pair of axially extending lips (20c, 20t) separated by a distance sufficient to permit a prewound spool (10) or other product to be inserted radially, laterally into the shell prior to closing the shell about the spool or other product.

7 Claims, 12 Drawing Sheets

APPARATUS FOR FORMING A VERY OPEN SHELL FOR LATERAL LOADING OF PRODUCT

CROSS REFERENCE TO RELATED APPLICATION

This application is related to the following concurrently filed applications of: (1) James C. Foote, Jr., Robert F. Allen, Paul E. Bailey, Dean B. Campbell, Thomas A. Cipolla, William G. Hoyt, Robert L. Huseby, Lyndon R. Huttemann, David H. Lancy, William C. Lebbon, Stephen M. Reinke, Thomas E. Stark and Joseph A. Watkins for Apparatus and Method for Forming and Loading a Magazine for Prewound Spools of Web Material, Ser. No. 622,985 now U.S. Pat. No. 5,044,144 issued Sep. 3, 1991; and (2) Stephen M. Reinke, James C. Foote, Jr., Thomas A. Cipolla, William G. Hoyt, Lyndon R. Huttermann and Joseph A. Watkins for Apparatus for Removing a Very Open Shell from a Forming Mandrel, Ser. No. 622,987.

DESCRIPTION

1. Technical Field

The present invention concerns methods and apparatus for forming very open shells for prewound spools of web material. More particularly, the invention concerns such methods and apparatus which are suitable for use with photographic film or similar sensitized web materials.

2. Background Art

A considerable variety of methods and apparatus have been developed over the years for packaging prewound spools of web material. For example, U.S. Pat. No. 2,940,232 discloses such an apparatus for use with photographic film in which strips of film are wound on spools, after which the wound spools are inserted axially into previously formed cylindrical magazine shells to which one end cap has already been applied, the shells having axially extending lips through which the leader of the film strip extends in the familiar manner. The cap for the open end of the shell is later applied. U.S. Pat. No. 3,466,845 discloses a multistation packaging apparatus in which a bendable chipboard blank is pressed into an elongated arcuate shape having an axially extending slot through which a wound core of product can be inserted, after which end caps are applied. U.S. Pat. No. 3,586,258 shows an apparatus for winding photographic film in which a previously formed magazine is provided which has axially extending lips. The spool is automatically oriented within the magazine to permit a guide tongue to insert film through the lips and into engagement with the core of the spool, after which the film is wound onto the spool within the magazine. U.S. Pat. No. 4,080,711 discloses another apparatus in which the film is inserted into an already complete magazine and wound onto the spool within the magazine. U.S. Pat. Nos. 4,115,913 and 4,614,019 show somewhat different types of methods and apparatus for winding film and loading prewound spools into magazines, in which the magazine shells are preformed with a rather wide axially extending slot, to facilitate axial insertion of a prewound spool of film, after which the shells are closed and end caps are applied.

While automatic packaging apparatus and methods of the types just discussed have achieved a measure of acceptance and success over the years, a need has continued to exist for apparatus and methods suitable for still higher rates of production, without sacrificing quality of the finished package or damaging the product during the packaging process. Particularly for winding and packaging photographic films and other sensitized materials which must be handled in near total darkness, a need has existed for such more productive equipment which would require a minimum of operator intervention during use, thus leading to still further improved rates of production.

SUMMARY OF THE INVENTION

The primary objective of the invention is to provide an improved method and apparatus for forming a very open shell into which a product can be loaded laterally between axially extending lips of the shell, rather than axially through one of its open ends, but which can be closed to a good right circular cylinder with minimal constraints during closing, the cylinder being suitable for installation of circular end caps.

This objective is given only by way of an illustrative example; thus, other desirable objectives and advantages inherently achieved by the disclosed apparatus and method of the invention may occur or become apparent to those skilled in the art. Nonetheless, the scope of the invention is to be limited only by the appended claims.

In accordance with a preferred embodiment of the method of the invention, there are provided a substantially rectangular metal blank for the side wall of a substantially cylindrical magazine for a spool, the blank having an opposed pair of axially extending lips and an opposed pair of end edges; and a mandrel having an exterior surface about which the blank may be formed. The exterior surface is uniquely configured in accordance with the invention so that when the blank is formed about the exterior surface from near one lip to near the other and the blank is then removed from the mandrel, the blank springs to a very open form in which the axially extending lips are spaced sufficiently far apart to permit a prewound spool or other product to pass radially, laterally between the lips, rather than axially through one of the open ends of the very open shell. The blank is formed about the mandrel and then removed. A prewound spool or other product may then be inserted between the lips and the very open shell may then be closed about the spool, after which the end caps may be applied. The prewound spool may have a trailing end of web material which projects outwardly between the lips after the shell is closed; however, the method of the invention is also applicable to spools whose trailing end is contained within the magazine after the shell is closed.

The method of the invention also is useful for forming substantially cylindrical containers for products other than spools of web material. In such other applications, the exterior surface of the mandrel is configured so that after forming the blank will spring open to a noncircular form having spaced side edges, after which the product can be inserted laterally or axially, the shell closed about the product and the end caps applied.

In the apparatus according to the invention, a source of substantially rectangular blanks of the type previously discussed is provided. A forming mandrel is used which has an exterior surface of the type previously described. Preferably, means are provided for roll forming the blanks about the mandrel from near one axially extending lip to near the other; however, other techniques for forming about the mandrel may be used. For example, the very open shell may be formed by several die segments that move in radially around the mandrel, by elastomeric dies that engage the very open form shell and yield as the shell is wrapped about the mandrel or by inflatable tools which form the shell about the mandrel.

In the preferred embodiment of the invention, the means for forming the blank comprises a rotatable forming dial and at least one frame attached to the forming dial for supporting the mandrel. In the illustrated embodiment, four mandrels are provided on the forming dial. Means are provided for positioning a metal blank on the mandrel prior to forming and for clamping one end of the blank against the mandrel. In the preferred apparatus for forming, a roller contacts the blank and rolls it around the mandrel to form the very open shell, after which the shell is clamped at its other end against the mandrel. At a shell removal station, the mandrel and clamped shell are moved essentially parallel to the axis of rotation of the forming dial to a position where the mandrel and shell enter the fixed claws of a nest fixture of a shell removal mechanism. The clamps on the shell are then released and the mandrel is withdrawn.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

The following is a detailed description of the preferred embodiments of the invention, reference being made to the drawings in which the same reference numerals identify the same elements of structure in each of the several Figures.

PRIOR ART METHOD

Figure 1:
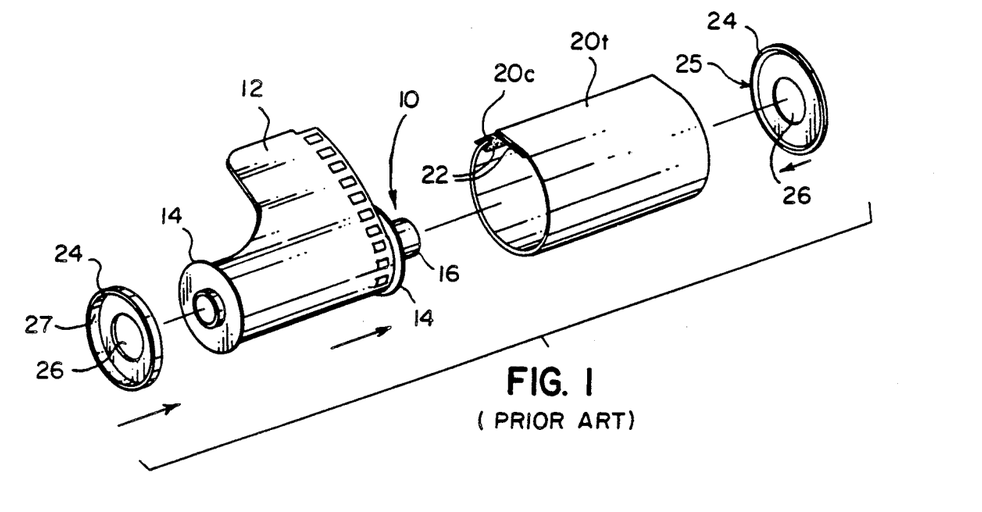
FIG. 1 shows an exploded perspective view of a known type of magazine for photographic film, illustrating one prior art technique for inserting a prewound spool axially into the shell of the magazine and applying the end caps.

FIG. 1 illustrates a known process for loading photographic film magazines. A spool 10 has been used which comprises a central core, not illustrated, on which is wound a strip 12 of photographic film. Spool 10 includes a pair of end flanges 14 from which extend hollow axial hubs 16. A preformed cylindrical metal shell 18 has been used which comprises a pair of axially extending lips 20c,20t between which strip 12 is withdrawn from or wound back into the magazine in use by the consumer. These axially extending lips typically are different in geometry, lip 20c being folded or crimped back on itself and lip 20t being essentially tangent to the cylindrical preformed shell 18. Typically, preformed shell 18 has been formed from a substantially flat rectangular blank, not illustrated, in which lips 20c,20t have previously been formed. To prevent leakage of light into the magazine, lips 20c and 20t have for many years been covered with a lightlock material such as black velvet or plush which firmly but gently engages the surfaces of the film and prevents light leakage into the magazine. The ends of the magazine are closed by a pair of annular end caps 24, each having an aperture 26 for rotatably receiving hubs 16 and a circumferentially extending groove and flange for fixedly engaging the end edges of preformed shell 18. Such magazines have been assembled by inserting the prewound spool of film axially into preformed shell 18 and then applying and staking end caps 24. While this spooling and assembling process is reliable and has been rather widely used, the apparatus for practicing the process tends to be limited in speed.

BASIC METHOD OF THE INVENTION

Figure 2:
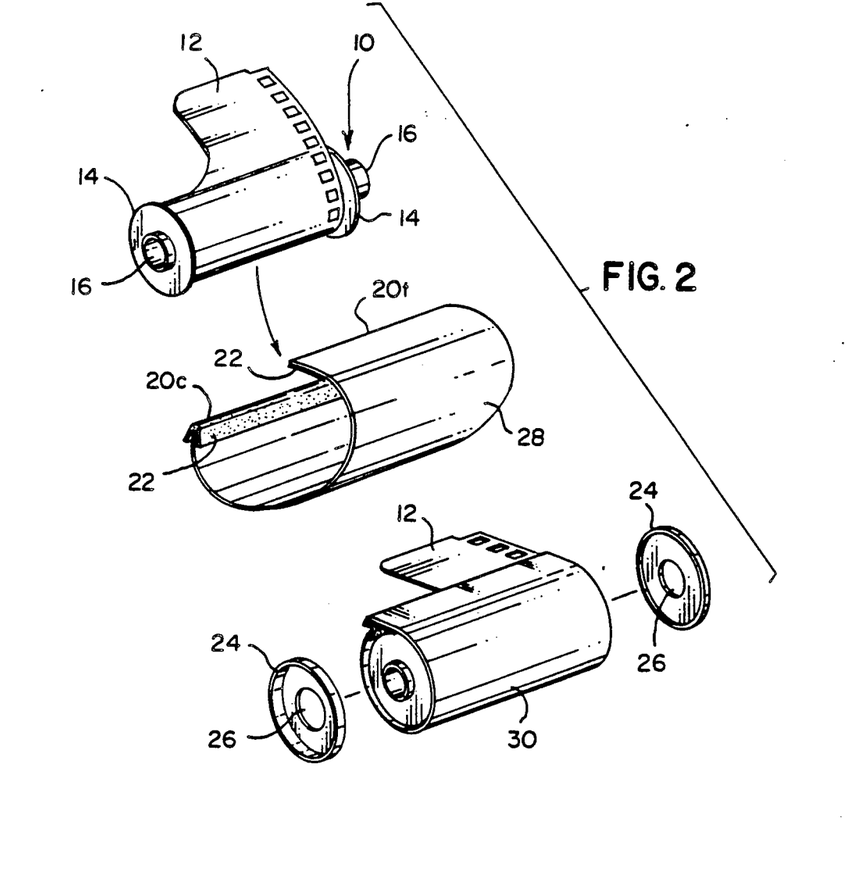
FIG. 2 shows an exploded perspective view of a known type of magazine for photographic film, illustrating a very open shell made in accordance with the present invention, which facilitates inserting a prewound spool radially, laterally into the shell.

FIG. 2 illustrates how a magazine may be assembled using a very open shell made in accordance with the method and apparatus of the present invention. In this instance, instead of the essentially cylindrical preformed shell 18 used in the past to permit axial insertion of the prewound spool, a very open preformed metal shell 28 is provided. Very open shell 28 is configured such that axially extending lips 20c,20t are spaced far enough apart to permit the prewound spool to be inserted laterally or radially into shell 28. Then, very open shell 28 may be closed about the prewound spool to a substantially cylindrical configuration 30 with the lead end of strip 12 captured between lips 20c,20t. Then end caps 26 may be applied and staked to complete the magazine. In the remainder of this specification, the method and apparatus will be described for forming the very open shell 28.

OVERALL OPERATION

Figure 3:
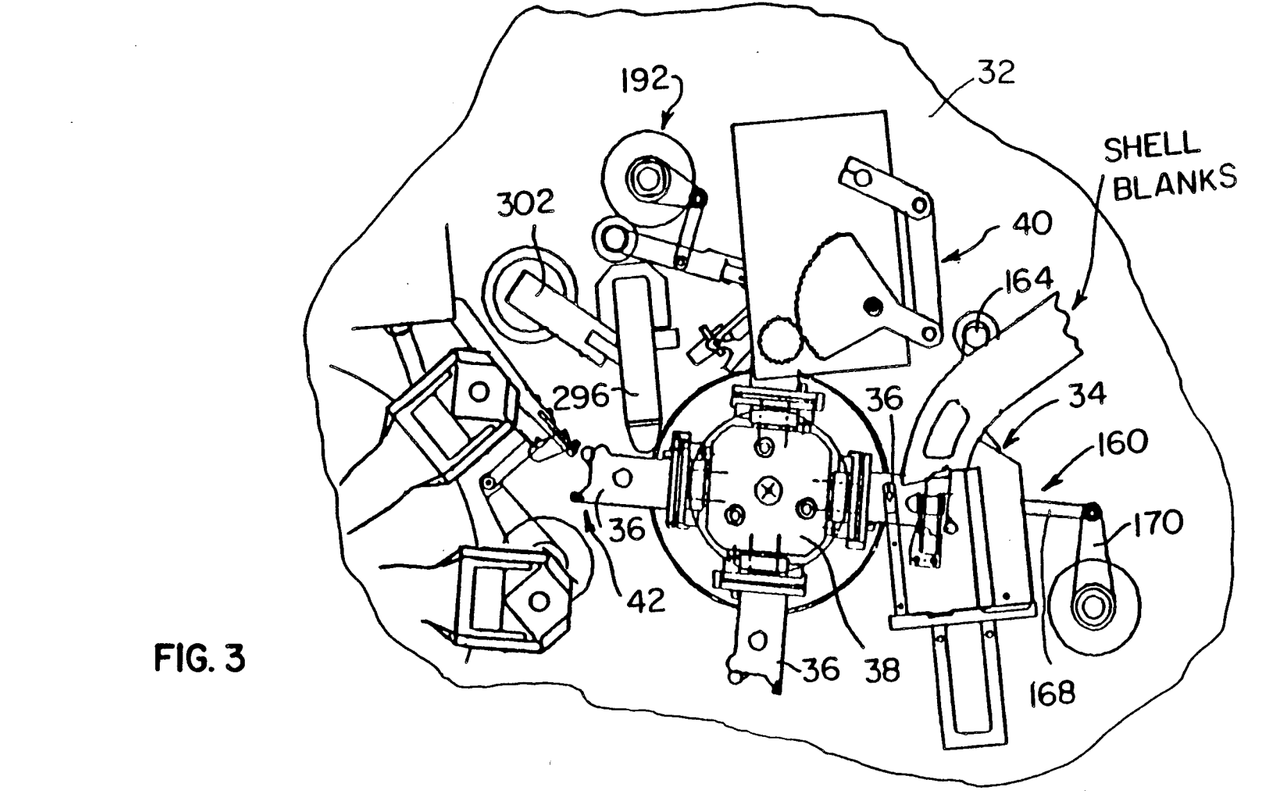
FIG. 3 shows a simplified, fragmentary, schematic front elevation view of an apparatus according to the invention.

FIG. 3 illustrates the overall layout of the apparatus according to the invention. A rigid, vertically standing face plate 32 is preferred to provide a mount for the components of the invention; however, face plate 32 may be oriented differently or replaced with a structural framework without departing from the scope of the invention. A shell blank feeding mechanism 34 receives substantially flat, rectangular metal blanks to be formed into the cylindrical side wall of the completed magazine, each blank having been previously provided with lips 20c,20t and lightlock strips 22. The shell blanks are fed one at a time to sequentially presented forming mandrels mounted on mandrel carriers 36 which in turn are mounted on a first forming dial 38 which rotates intermittently to index mandrel carriers 36 from position to position. As forming dial 38 is indexed, each mandrel carrier 36, having received a shell blank from feeding mechanism 34, is presented to a forming station 40 where very open shell 28 is formed about the mandrel. As forming dial 38 is indexed again, each mandrel carrier, with very open shell 28 formed about its mandrel, is presented to a shell removal station 42 where very open shell 28 is removed from the mandrel by a shell removal mechanism 44, shown fragmentarily in FIGS. 20 to 24, mounted on an adjacent assembly dial 46, also shown fragmentarily.

SHELL FEEDING AND ROLL FORMING STATIONS 34,40

Figure 4:
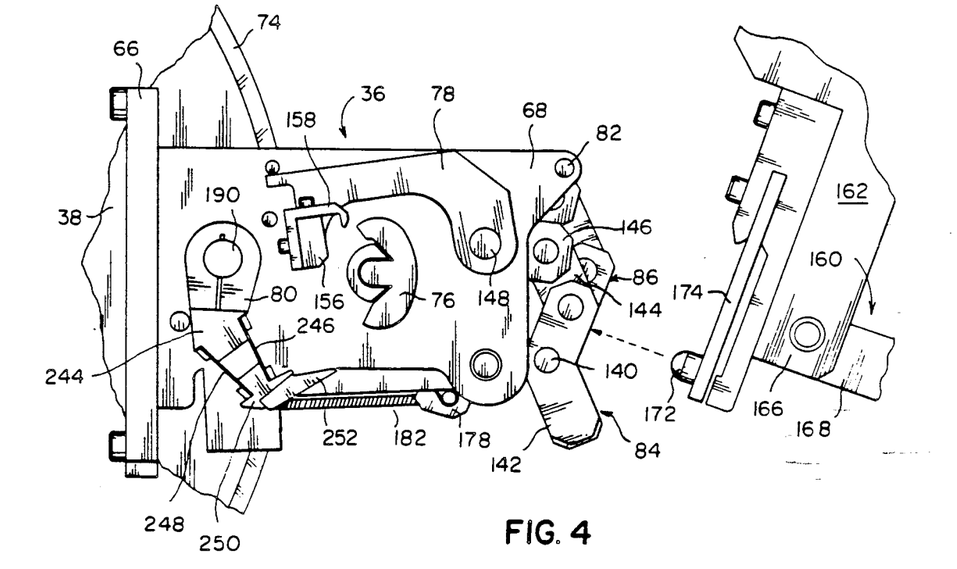
FIG. 4 shows an enlarged, fragmentary front elevation view of the apparatus of FIG. 3, illustrating the mandrel used to form a very open shell in accordance with the invention.
Figure 5:
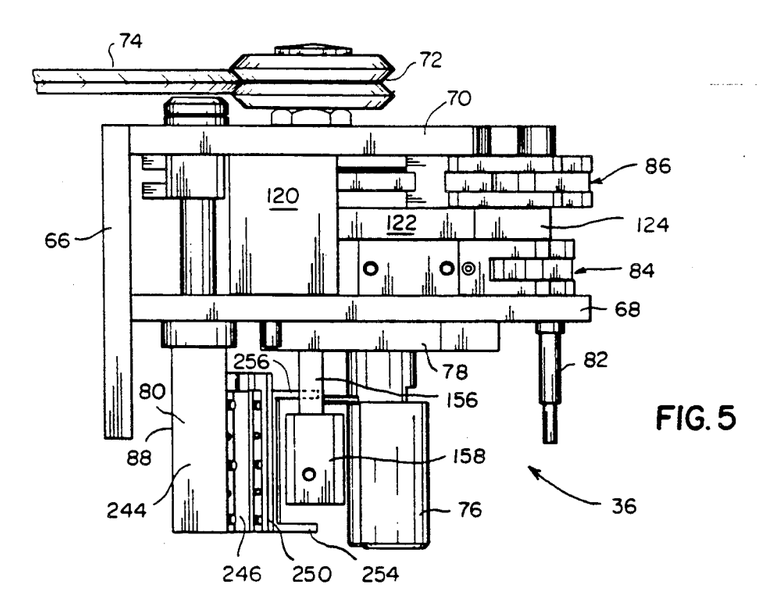
FIG. 5 shows a top plan view of a portion of the apparatus of FIG. 4.
Figure 6:
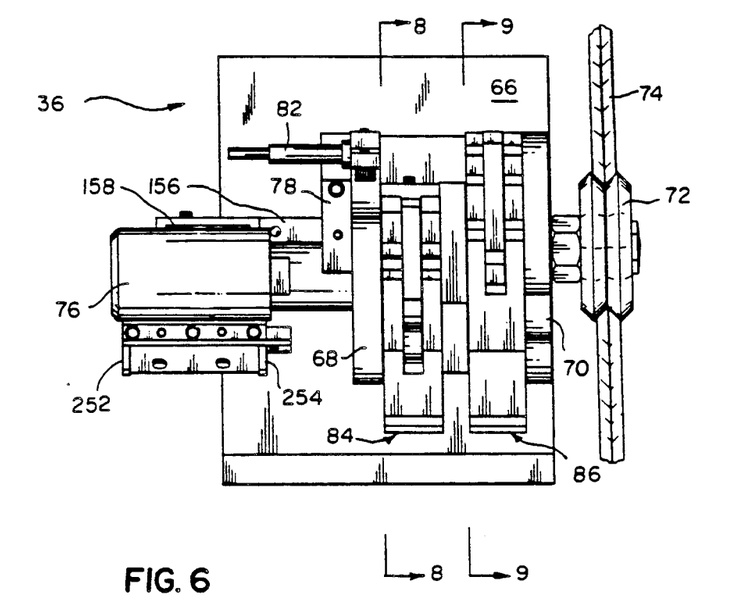
FIG. 6 shows a side elevation view of the apparatus of FIG. 4, taken from the right side as viewed in FIG. 4.

FIGS. 4, 5 and 6 show front, top and right side views of one of mandrel carriers 36 as positioned for delivery of a substantially flat, metal shell blank. Each mandrel carrier 36 is mounted on forming dial 38 via a carriage, not shown in FIGS. 4, 5 and 6, which permits the mandrel carrier to be moved in and out of the plane of FIG. 4, as will be discussed in greater detail with regard to FIGS. 20, 21 and 22. Each mandrel carrier 36 comprises a base plate 66 from which extend radially a pair of front and rear side plates 68, 70. On the rear surface of side plate 70 is mounted a grooved guide wheel 72 which engages a circular guide track 74 fixed to face plate 32 behind dial 38, to axially position each mandrel carrier 36 as forming dial 38 rotates from position to position. On the front surface of side plate 68 are mounted a fixed roll forming mandrel 76, a first rotatable clamping arm 78, a second rotatable clamping arm 80 and a stop pin 82 for the shell blank. Between side plates 68,70 are located over-center toggle linkages 84 for rotating clamping arm 78 to initially clamp lip 20c of a shell blank against mandrel 76 prior to and during roll forming, and 86 for rotating clamping arm 80 to subsequently clamp lip 20t of the rolled shell blank against mandrel 76 after roll forming.

Figure 7:
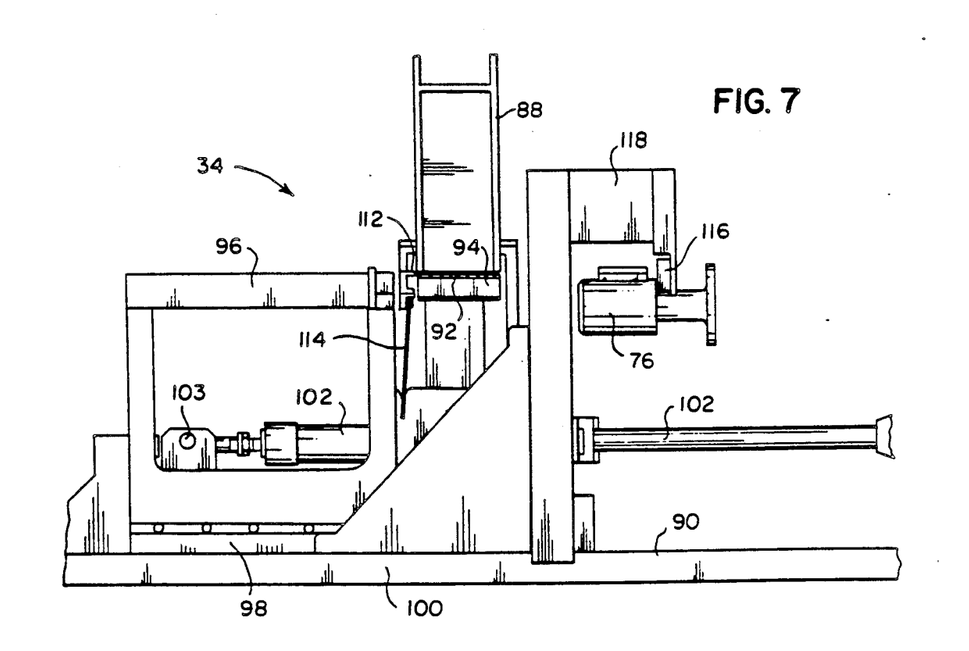
FIG. 7 shows a side elevation view of the apparatus for delivering metal blanks to the forming mandrel in accordance with the invention, taken from the right side as viewed in FIG. 3.
Figure 10:
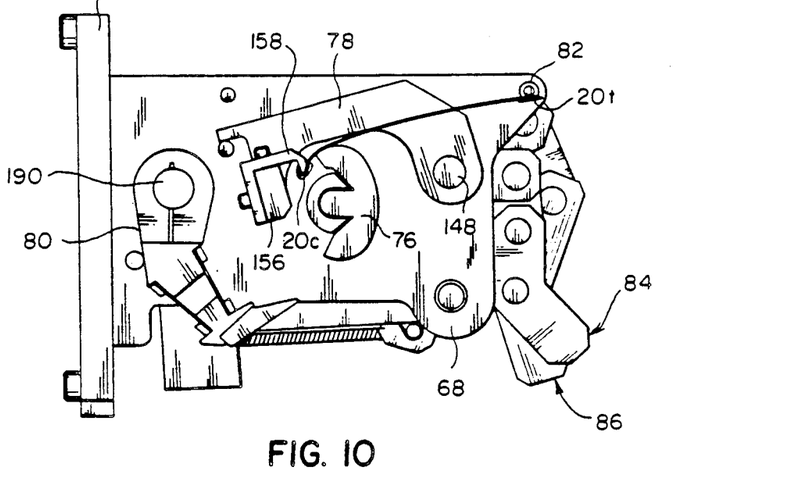
FIG. 10 shows the apparatus of FIG. 4 after a metal blank has been delivered to the mandrel and clamped in place.

FIG. 7 illustrates schematically the shell blank feeding mechanism 34 used to present a metal shell blank to mandrel 76 for roll forming. A supply of such blanks is maintained by the operator in a gravity feed chute 88 mounted on a frame member 90 attached to face plate 32. The lowermost blank 92 is withdrawn from chute 88 by a magnet 94 and positioned in a plane tangent to the upper edge of mandrel 76 as viewed in FIG. 4. The upper surface of magnet 94 is located in this plane and magnet 94 is supported on a frame 96 which is mounted on a slide 98 supported by a frame member 100 attached to face plate 32. To deliver blank 92 to mandrel 76, frame 96 is pulled along slide 98 by an actuator rod 102 which is pivoted at 103 to frame 96 and may be oscillated back and forth by a conventional rotating crank mechanism, not illustrated. As blank 92 slides onto the upper surface of mandrel 76, magnet 94 passes in front of mandrel 76, as viewed in FIG. 7. Blank 92 is prevented from rearward movement by a pair of positioning fingers 112, only one of which is visible in FIG. 7, which contact the trailing edge of blank 92 during movement and which are supported on a leaf spring 114 attached to frame 96. When frame 96 has reached the limit of its travel, the leading edge of blank 92 contacts a stop 116 supported by an arm 118 of frame 100. In this position, fingers 112 are biased against the trailing edge of the blank to hold it against stop 116. The use of leaf spring 114 makes it possible to use a continuously rotating crank mechanism, since the flexibility of the spring provides a brief dwell to hold the blank in place while the frame 96 stops and reverses direction. Rotatable clamping arm 78 is then actuated to clamp lip 20c against mandrel 76, which causes the end of the blank including lip 20t to swing up into contact with stop pin 82, as shown in FIG. 10. Frame 96 is then returned to the position shown in FIG. 7, where the next blank is drawn onto magnet 94.

Figure 8:
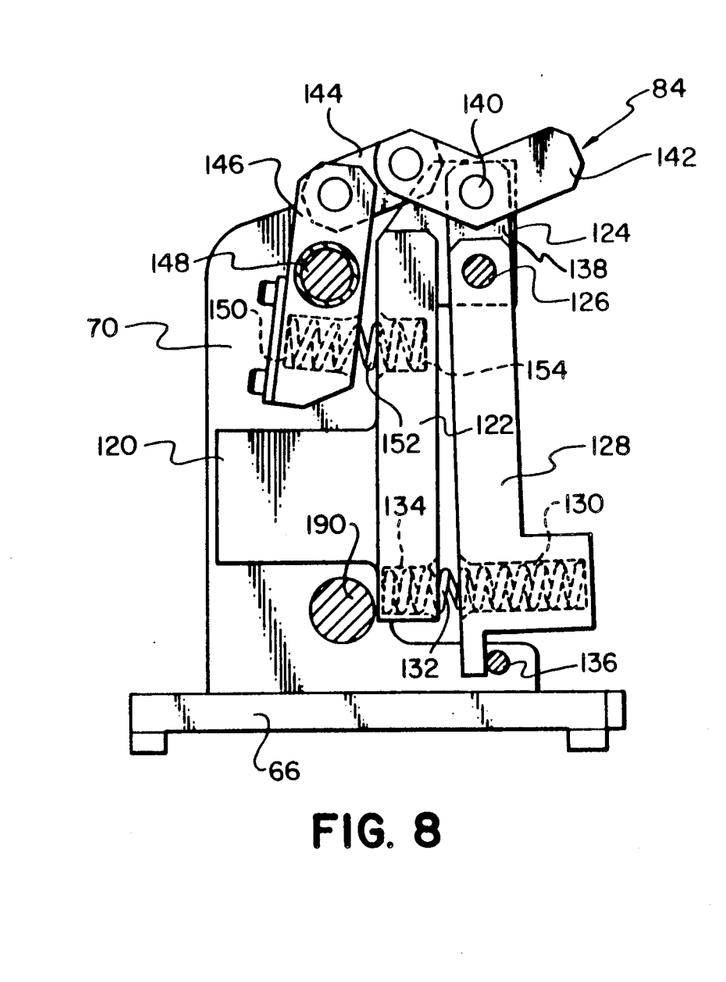
FIG. 8 shows a view along line 8—8 of FIG. 6.

FIG. 8 shows the toggle linkage 84 which actuates and releases rotatable clamping arm 78. An anchor block 120 extends between side plates 68,70. Preferably, block 120 includes, at a location essentially midway between side plates 68,70, an integral radially extending arm 122 having a transversely extending head 124 at its radially outer end. Pivoted on a shaft 126 between side plate 68 and head 124 is a load arm 128 having near its radially inner end a spring pocket 130 which captures one end of a spring 132 whose other end is captured in a spring pocket 134 located in the radially inner end of arm 122. Rotational movement of load arm 128 is limited by a stop pin 136 extending from side plate 68. On the opposite side of shaft 126 from spring pocket 130, arm 122 includes an extension 138 which supports a shaft 140 on which a vee-shaped trip arm 142 is rotatably mounted. One end of trip arm 142 is pivotably connected to one end of a link 144, the opposite end of which is pivotably connected to a pivot arm 146 fixedly mounted on a shaft 148 which is pivotably mounted between side plates 68,70. Pivot arm 146 includes a spring pocket 150 which captures one end of a spring 152, the other end of which is captured in a spring pocket 154 located in radially extending arm 122. Shaft 148 extends outwardly through side plate 68 where, as shown in FIG. 4, it supports rotatable clamping arm 78. As shown in FIGS. 4 and 5, arm 78 includes a transversely extending portion 156 which supports a hook member 158 for engaging lip 20c as shown in FIG. 10.

To operate the toggle linkage shown in FIG. 8, an actuator mechanism 160 is provided as shown schematically in FIG. 3 and fragmentarily in FIG. 4. An actuator arm 162 is pivoted at its upper end 164 to face plate 32 and at its lower end 166 to a connecting rod 168 operatively connected to a crank arm 170 which may be rotated by a conventional oscillator, not illustrated. When a shell blank has been placed in contact with stop 116, arm 170 is rotated to move connecting rod 168 and cause actuator arm 162 to move from the position shown in FIG. 4 toward the end of trip arm 142 connected to link 144. A contact button 172 is mounted on the free end of a cantilever leaf spring 174 attached to lower end 166 of actuator arm 162. Button 172 is pressed against trip arm 142, causing it to rotate counterclockwise as seen in FIG. 4. This movement causes shaft 148 to rotate so that hook member 158 engages lip 20c on the shell blank and moves the blank to the position shown in FIG. 10. Reverse motion of shaft 148 under the influence of springs 132 and 154 is prevented because the pivot point between trip arm 142 and link 144 moves over center. Thus, the shell blank is fixed near lip 20c to the outer surface of mandrel 76 and near lip 20t against stop pin 82.

Figure 9:
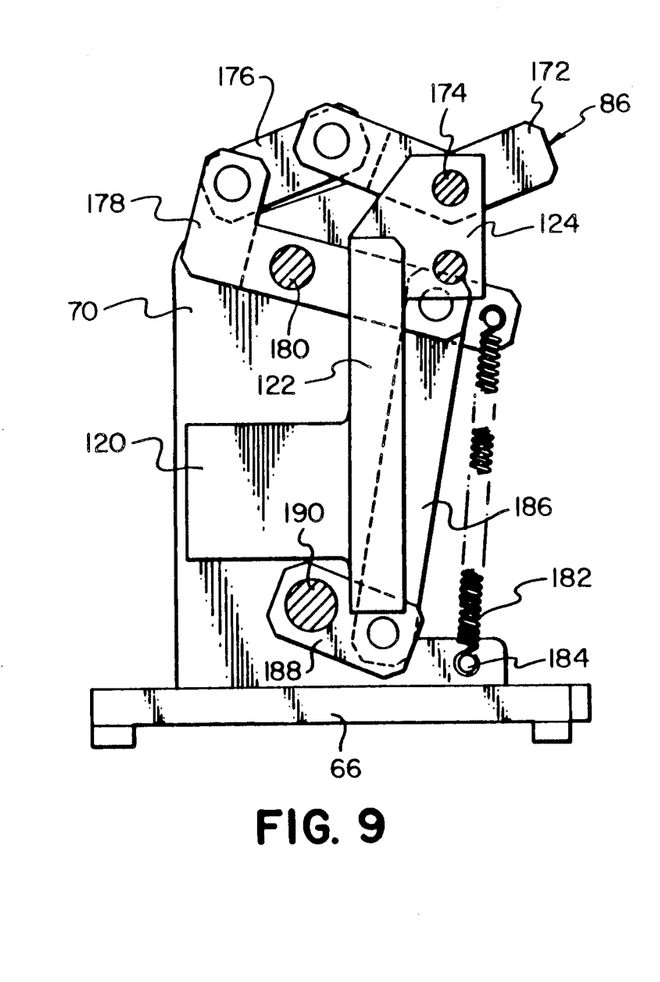
FIG. 9 shows a view along line 9—9 of FIG. 6.

Second rotatable clamping arm 80 is actuated and released by the toggle linkage 86 shown in FIG. 9. Near the radially outer edge of transversely extending portion 124, a vee-shaped trip arm 172 is pivotably mounted on a shaft 174 extending between portion 124 and side plate 70. One side of trip arm 172 is pivotably connected to one end of a link 176 whose opposite end is pivotably connected to an elongated crank arm 178 pivotably supported on a shaft 180 extending from side plate 170. At the opposite end of crank arm 178 from its connection to link 176, the crank arm is pulled radially inwardly by an extension spring 182 connected between the crank arm and a pin 184 extending from side plate 70. Between shaft 180 and the point of attachment of spring 182, an elongated link 186 is pivotably connected, the opposite end of link 186 being pivotably connected to a pivot arm 188 mounted for rotation with a shaft 190 which extends from side plate 70 through side plate 68 and supports rotatable clamping arm 80. The toggle linkage shown in FIG. 9 is operated by an actuator mechanism 192 shown schematically in FIG. 3 and in larger scale in FIG. 11, as will be discussed in detail subsequently.

Figure 11:
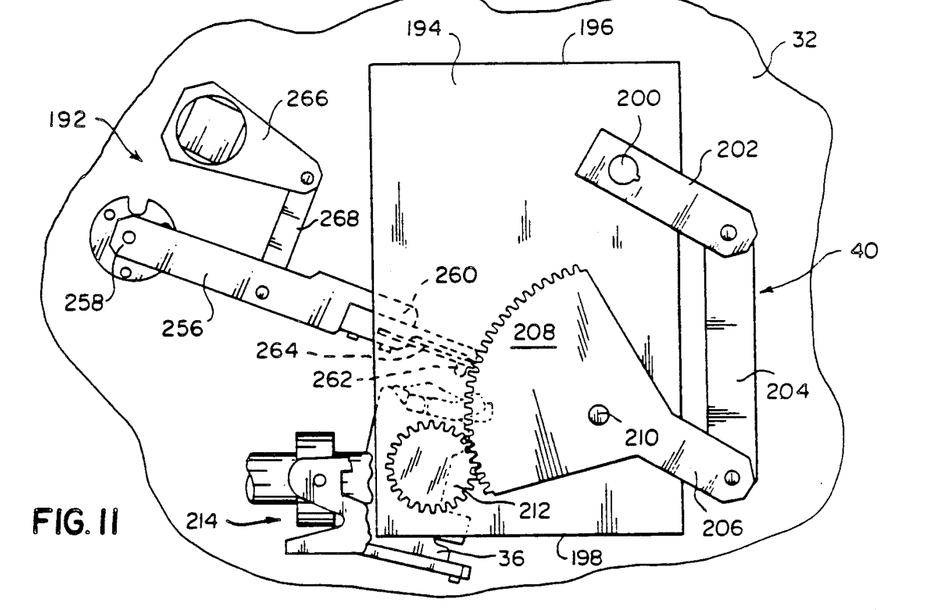
FIG. 11 shows a fragmentary front elevation view of the apparatus of FIG. 3, illustrating portions of the mechanism for roll forming a metal blank about the mandrel.

Once a shell blank has been placed in position on mandrel 76 as shown in FIG. 10, forming dial 38 is rotated by a conventional indexer, not illustrated, until mandrel carrier 36 is positioned at forming station 40. FIG. 11 shows an enlarged view of roll forming station 40. A support plate 194 is spaced in front of face plate 32 by supports extending behind its upper edge 196. Thus, the lower edge 198 of plate 194 is spaced from face plate 32 sufficiently to permit mandrel carrier 36 to move into position for forming of the shell blank positioned on mandrel 76. Preferably the shell blank is roll formed and the mechanism for actuating the roll former is mounted on or supported in part by support plate 194. This mechanism comprises an actuator shaft 200 mounted for reciprocating rotation in support plate 194 and face plate 32, a crank arm 202 mounted for rotation with shaft 200, a link 204 pivotably connected at one end to crank arm 202 and at the other end to a pivot arm 206 formed integrally with a gear sector 208 mounted for rotation on an axle 210 journaled in plate 194. Actuator shaft 200 may be driven by a conventional indexer, not illustrated. A pinion gear 212 is mounted for rotation in support plate 194, meshed with gear sector 208 and operatively connected to the roll former as shown in FIG. 12.

Figure 12:
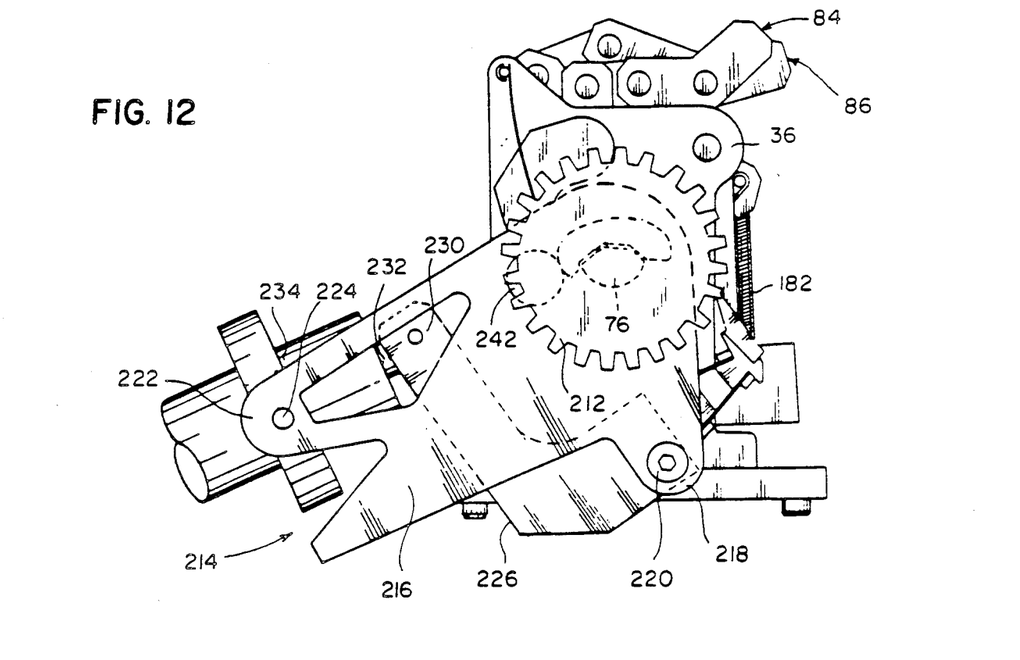
FIG. 12 shows the mechanism of FIG. 11 with its front plate and gear train removed and with the mechanism of FIG. 4 rotated into position for roll forming of the metal blank.
Figure 13:
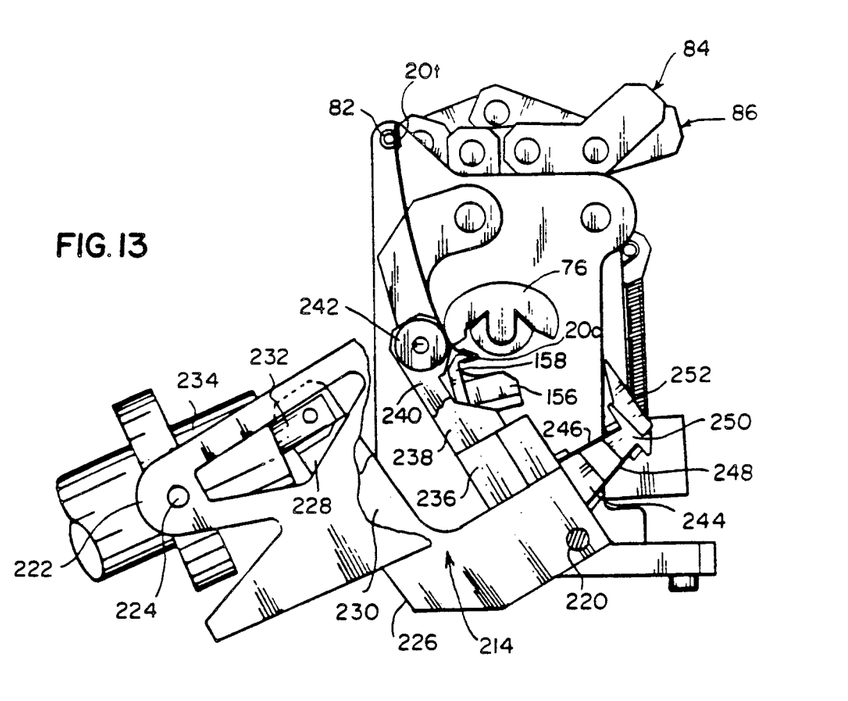
FIG. 13 shows the mechanism of FIG. 12 partially broken away to illustrate the cooperation of the forming roller with the metal blank and the mandrel.
Figure 14:
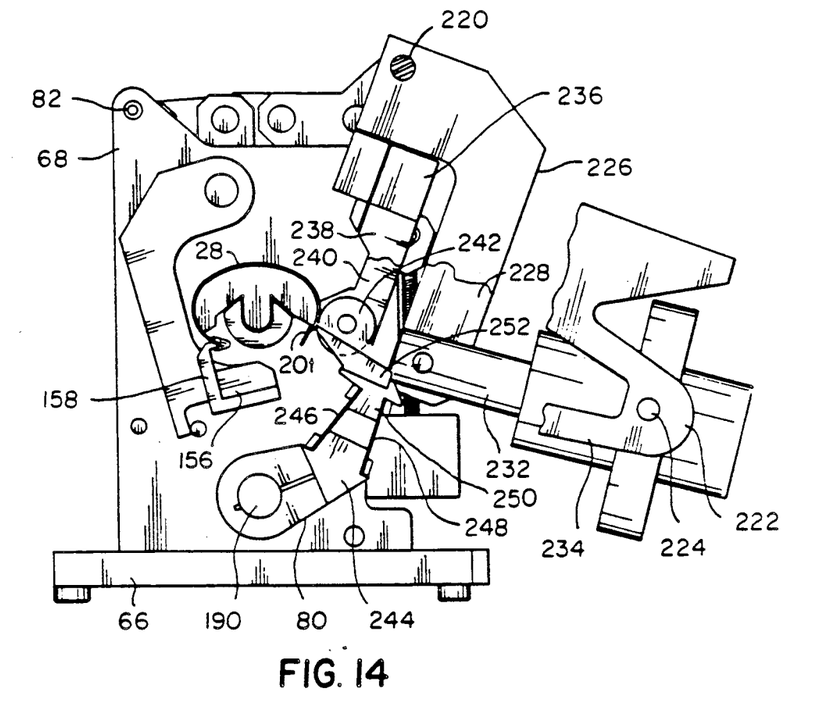
FIG. 14 shows the mechanism of FIG. 13 with the forming roller rotated about the mandrel to complete forming a very open form shell from the metal blank and with both ends of the shell clamped to the mandrel.
Figure 15:
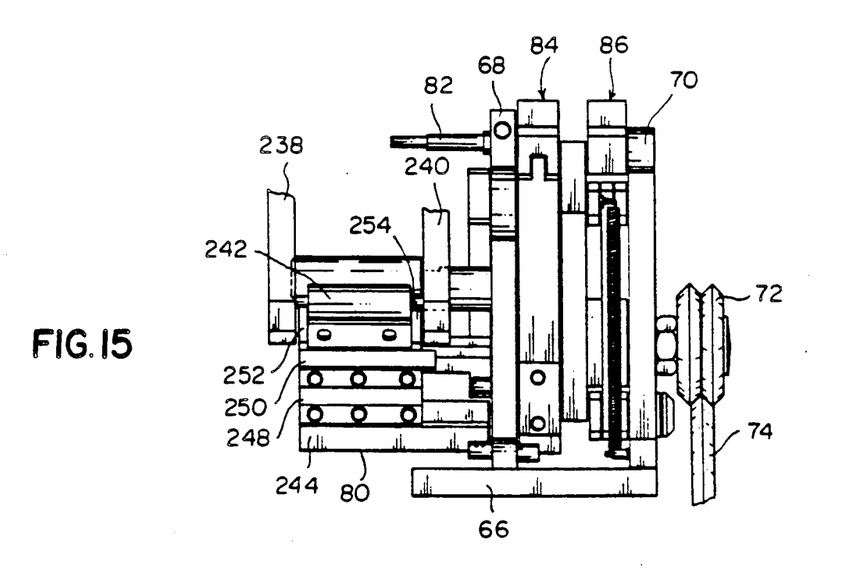
FIG. 15 shows a view of the right side of the mechanism of FIG. 14, partially broken away to illustrate the cooperation of the forming roller with the clamp for the end of the shell.

In FIG. 12, support plate 194 has been removed from view, leaving visible only pinion gear 212 and mandrel carrier 36, while revealing the roll former mechanism 214. An elongated support plate 216 is connected for reciprocating rotation to the shaft of pinion gear 212. The axis of pinion gear 212 preferably is parallel to all elements of the forming surface of mandrel 76, shown in phantom in FIG. 12. Along its lower edge as seen in FIG. 12, support plate 216 includes a downwardly projecting ear 218 which supports an axle 220 which extends beneath mandrel 76 in the positions of FIGS. 12 and 13. Along its upper edge as seen in FIG. 12 and at the opposite end from the location of axle 220, support plate 216 includes a further ear 222 which supports an axle 224. In FIGS. 13 and 14, support plate 216 has been partially broken away to reveal the components of roll former mechanism 214. Axle 220 rotatably supports a yoke 226 having a pair of arms 228,230 as seen in FIG. 13. The ends of arms 228,230 are positioned on opposite sides of and pivotably connected to the plunger rod 232 of a disk compression spring device 234 pivotably mounted on axle 224; so that, device 234 constantly biases yoke 226 to rotate about shaft 220 in the clockwise direction as viewed in FIG. 13. Those skilled in the mechanical arts will appreciate that device 234 may comprise a stack of disk springs captured within a cylinder and that movement of plunger rod 232 into such cylinder would compress the washers to produce the desired biasing force. Mounted on yoke 226 just above axle 220 is a forming roller support yoke 236 having a pair of arms 238,240 as seen in FIGS. 13 and 14. The ends of arms 238,240 are positioned at opposite ends of and rotatably support a forming roller 242. As mandrel carrier 36 is indexed into the position shown in FIGS. 12 and 13, the shell blank contacts forming roller 242 near lip 20c which, as previously discussed, has already been clamped against mandrel 76. As a result of this contact, forming roller 242 and yoke 226 pivot counterclockwise about shaft 220 as seen in FIGS. 12 and 13, causing plunger 232 to press inward against the springs in device 234, thereby firmly pressing forming roller 242 into engagement with the shell blank and the underlying mandrel.

To form the shell blank into very open shell 28 as shown in FIG. 2, crank arm 202 is rotated counterclockwise thereby causing gear sector 208 to rotate in the same direction which causes pinion gear 212 to rotate clockwise until roll forming mechanism 214 reaches the position of FIG. 14. During this rotation, the biasing force of device 234 holds forming roller 242 firmly in contact with the shell blank as roller 242 rolls the blank about the outer surface of mandrel 76. When roller 242 has reached a position near to lip 20t as shown in FIG. 14, toggle linkage 86 is actuated by mechanism 192, shown in FIG. 11, thereby causing shaft 190 to rotate clamping arm 80 to the position shown in FIG. 14. Mechanism 192 comprises an actuator arm 256 pivotably connected at its end 258 to face plate 32. At the opposite end 260 of arm 256, a toggle actuating button 262 is supported on a cantilever spring 264, as shown in phantom in FIG. 11. A crank arm 266 is pivotably mounted to face plate 32 for reciprocating rotation by a conventional oscillator, not illustrated, and is connected by a link 268 to actuator arm 256.

When a shell blank has been roll formed to the configuration shown in FIG. 14, mechanism 192 is actuated to press trip arm 172 and link 176 toward shaft 180, thereby causing shaft 190 to rotate clamping arm 80 into engagement with the completed very open shell 28. As shown in FIGS. 4, 5, 14 and 15, clamping arm 80 comprises a transverse portion 244 which extends beneath forming roller 242 in the position of FIG. 14. A pair of canted leaf springs 246,248 are attached between portion 244 and a transverse bar 250 having at its opposite ends clamping fingers 252, 254 which, when toggle linkage has been actuated to the position of FIGS. 14 and 15, extend between the ends of forming roller 242 and arms 238,240 of support yoke 236 and into contact with the shell blank near lip 20t. The use of canted leaf springs 246,248 causes bar 250 and clamping fingers 252,254 to rotate relative to portion 244 and thus to pull the shell in the direction of lip 20t to ensure good contact with the mandrel during subsequent processing. Thus, very open shell 28 is held firmly against mandrel 76. With roll former mechanism 214 in the position of FIG. 14, mandrel carrier 36 can be indexed away to shell removal station 42, after which shaft 200 is rotated in the opposite direction, to return roll former mechanism 214 to the position of FIG. 11, ready to receive the next mandrel carrier.

GEOMETRY OF FORMING MANDREL 76

FIGS. 16 to 19 illustrate a preferred technique for determining the geometry of the exterior surface of mandrel 76 about which the shell blank is formed. The objectives in determining this geometry are to ensure (a) that when a substantially flat, rectangular metal shell blank is formed about the exterior surface from near lip 20c to near lip 20t and the blank is then removed from the mandrel, the blank will spring to a very open form in which lips 20c,20t are spaced sufficiently far apart as seen in FIG. 2 to permit a previously wound spool to pass laterally or radially between lips 20c,20t with the trailing end of the film on the spool projecting outwardly between the lips; and (b) that after lateral insertion of the prewound spool, the blank can be closed to form a substantially cylindrical shell to which end caps 24 can be readily applied.

Figure 16:
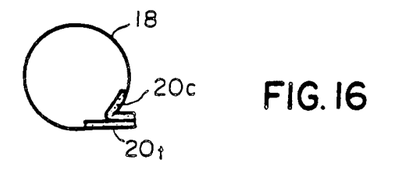
FIG. 16 shows a simplified crossectional view of a magazine of the type assembled in accordance with the invention.
Figure 17:
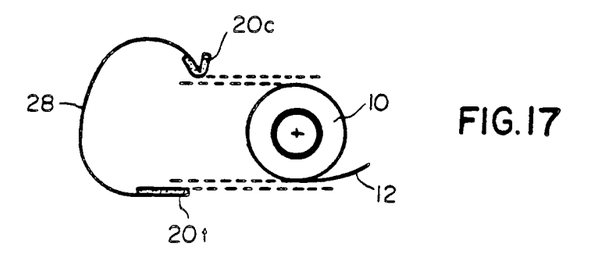
FIG. 17 shows such a magazine with its film withdrawal lips pulled open.

Using commercially available software such as NASTRAN published by the McNeal Schwendler Corporation for modelling preformed metal shell 18, a simplified computer based model of the shell is created as illustrated in FIG. 16. Assuming that lip 20t is held fast; that there are no internal stresses in the shell; that the material of the shell has the lowest yield strength anticipated in the actual product and the actual thickness to be used in the product; and that the stress-strain curve of the material has a positive slope, shell 18 is deflected by applying force to lip 20c, pulling upward and spreading the lips as viewed in FIG. 17 while permitting lip 20c to move laterally if needed. The force is then removed and the model is allowed to relax to its free standing condition. The force applied is increased or decreased until the spacing between lips 20c,20t in the relaxed condition is sufficient to permit lateral insertion of a prewound spool. This technique produces a model of very open form shell 28 as shown in FIG. 2 and FIG. 17. As shown in FIGS. 2 and 17, the radius of curvature of very open form shell 28 decreases from about the midpoint of the shell to near lips 20c,20t.

Figure 18:
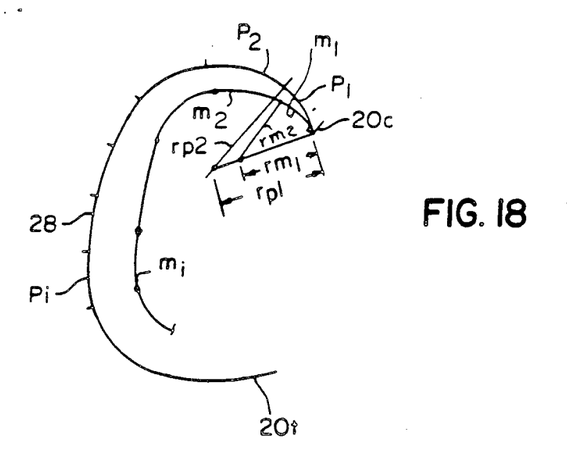
FIG. 18 shows a geometric construction illustrating how the geometry of the mandrel can be determined from the open shell geometry of FIG. 17.
Figure 19:
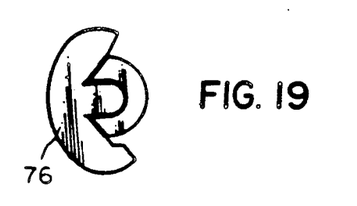
FIG. 19 shows an end view of a mandrel having an exterior surface configured in accordance with the construction of FIG. 18.

Using finite element analysis and assuming that the model of very open shell 28 has no internal stresses and no memory of having once been round as in FIG. 16, as would be the case for a shell formed from an originally flat blank, the model can then be closed back to the configuration of FIG. 16 to confirm that the shell will close to a good, cylindrical shape suitable for installation of end caps. Then, using material of the desired thickness and the lowest anticipated yield strength, a series of tests are conducted to develop plots showing for mandrels of different radii, the radii to which parts spring back following roll forming around the mandrel; that is, plots of part radius versus mandrel radius. Such plots can be modeled using commercially available software and it can be shown that $$R_{part} = 0.5\ t + e^{-[a - bR_{mandrel} + c(R_{mandrel})^2]},$$

where t is the thickness of the shell material and a,b and c are constants. Then, as shown in FIG. 18, the model of very open form shell 28 is broken into small but not necessarily equal length arc segments $P_1$ to $P_i$ along its circumference. From the computer model of very open shell 28, the radius $r_{p1}$ of shell 28 at lip 20c can be determined, which is the radius at the beginning of segment $P_1$. From the value of $r_{p1}$, the corresponding radius $r_{m1}$ of mandrel 76 to produce $r_{p1}$ can be calculated using the relationship given above. With minor adjustment for the thickness of the wall of shell 28, the length of segments $P_1$ to $P_i$ along the circumference of the shell will be about the same as corresponding segments $M_1$ to $M_i$ along the circumference of the mandrel. Using radius $r_{m1}$ and assuming that the radius is perpendicular to the beginning of its corresponding segment $M_1$ near lip 20c, the location of the center for $r_{m1}$ can be determined and segment $M_1$ can be constructed as illustrated. Then, the computer determines from the model for shell 28 the radius $r_{p2}$ for the beginning of segment $P_2$, calculates $r_{m2}$, locates the center for $r_{m2}$ and constructs segment $M_2$ of the surface of the mandrel. This process is then repeated for each segment of very open shell 28 until the geometry of a mandrel surface has been determined, as shown in FIG. 19, on which shell blanks can be roll formed to produce a very open form shell 28. As indicated by the preceding calculations and geometric constructions and as shown in FIGS. 14 and 19, the exterior surface of mandrel 76 has a circumferentially changing radius of curvature; that is, mandrel 76 is non-circular. Because the shape of the mandrel is determined using the lowest yield strength material, the mandrel will produce proper very open form shells 28 with higher yield strength materials as well and such shells will also close to a good cylindrical form. As seen in FIGS. 4, 10, 13, 14, 19, 22 and 24 and in a manner similar to the shape of very open form shell 28, the radius of curvature of mandrel 76 decreases from about the midpoint of the surface of the mandrel to points near where lips 20c,20t are clamped to the mandrel.

SHELL REMOVAL STATION 42

Figure 20:
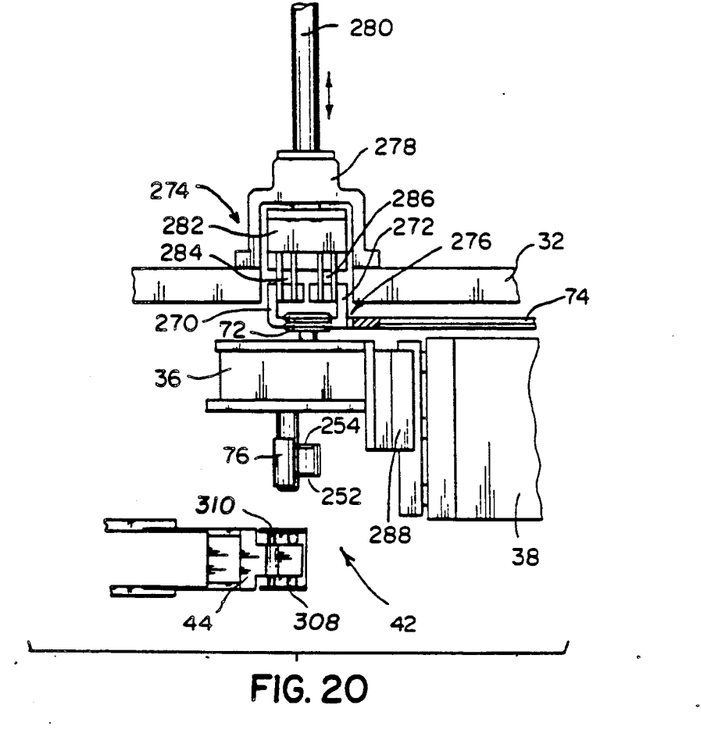
FIG. 20 shows a fragmentary top plan view of the roll forming mechanism, illustrating the mechanism which moves the mandrel carrier outward to deliver the very open shell to a device for removing the shell.
Figure 21:
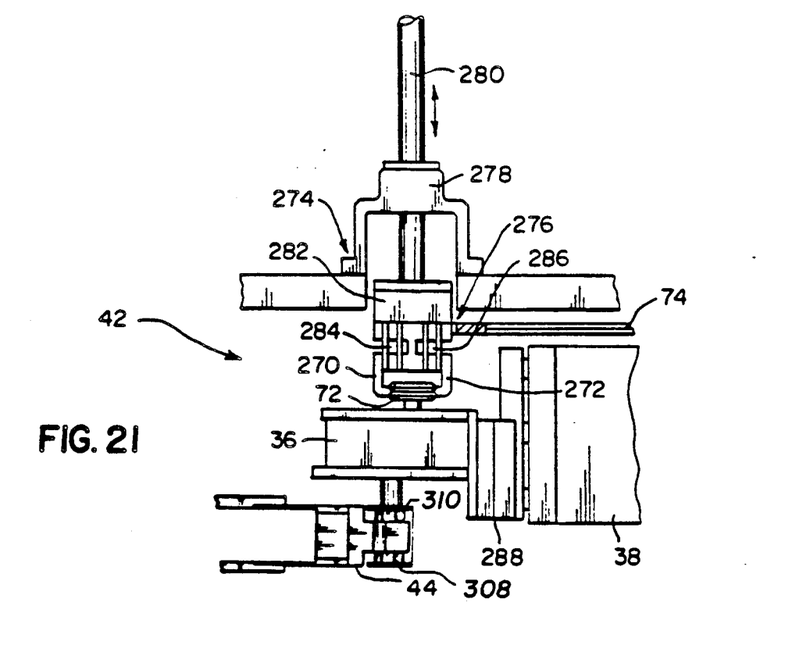
FIG. 21 shows the mechanism of FIG. 20 with the mandrel inserted into the means for removing the shell.

When mandrel carrier 36 reaches shell removal station 42 as shown in FIG. 20, grooved guide wheel 72 rolls from guide track 74 to a position between the jaws 270,272 of a mechanism 274 mounted on face plate 32. Mechanism 274 is configured to move mandrel carrier 36 outward from the position of FIG. 20 to the position of FIG. 21 in which very open shell 28 is accessible to shell removal mechanism 44. In the position of FIG. 20, jaws 270,272 extend into a circumferentially extending gap 276 in guide track 74; so that, as guide wheel 72 leaves guide track 74, it moves directly between the jaws. Only the radially inner portion of gap 276 is visible in FIGS. 20 and 21. Mechanism 274 comprises a housing 278 mounted on the back side of face plate 32, a spline shaft 280 supported by housing 278 for sliding movement and extended through an opening in face plate 32, and a conventional oscillator, not illustrated, for moving shaft 280 between the positions of FIGS. 20 and 21. Attached to the end of shaft 280 is a mounting block 282 to which are attached pairs 284,286 of stiff leaf springs which in turn are attached to jaws 270,272 respectively. When guide wheel 72 moves between jaws 270,272, springs 284,286 are deflected radially outward; so that, the jaws are biased into engagement with the guide wheel. Each mandrel carriage 36 is attached to forming dial 38 by means of a slide 288 which, once guide wheel 72 has left guide track 74, permits movement of mandrel carriage 36 between the positions of FIGS. 20 and 21. Thus, when mandrel carriage 36 reaches the position of jaws 270,272, forming dial 38 is stopped and mechanism 274 is actuated to move carriage 36 outwardly, essentially parallel to the axis of rotation of dial 38, to the position of FIG. 21.

Figure 22:
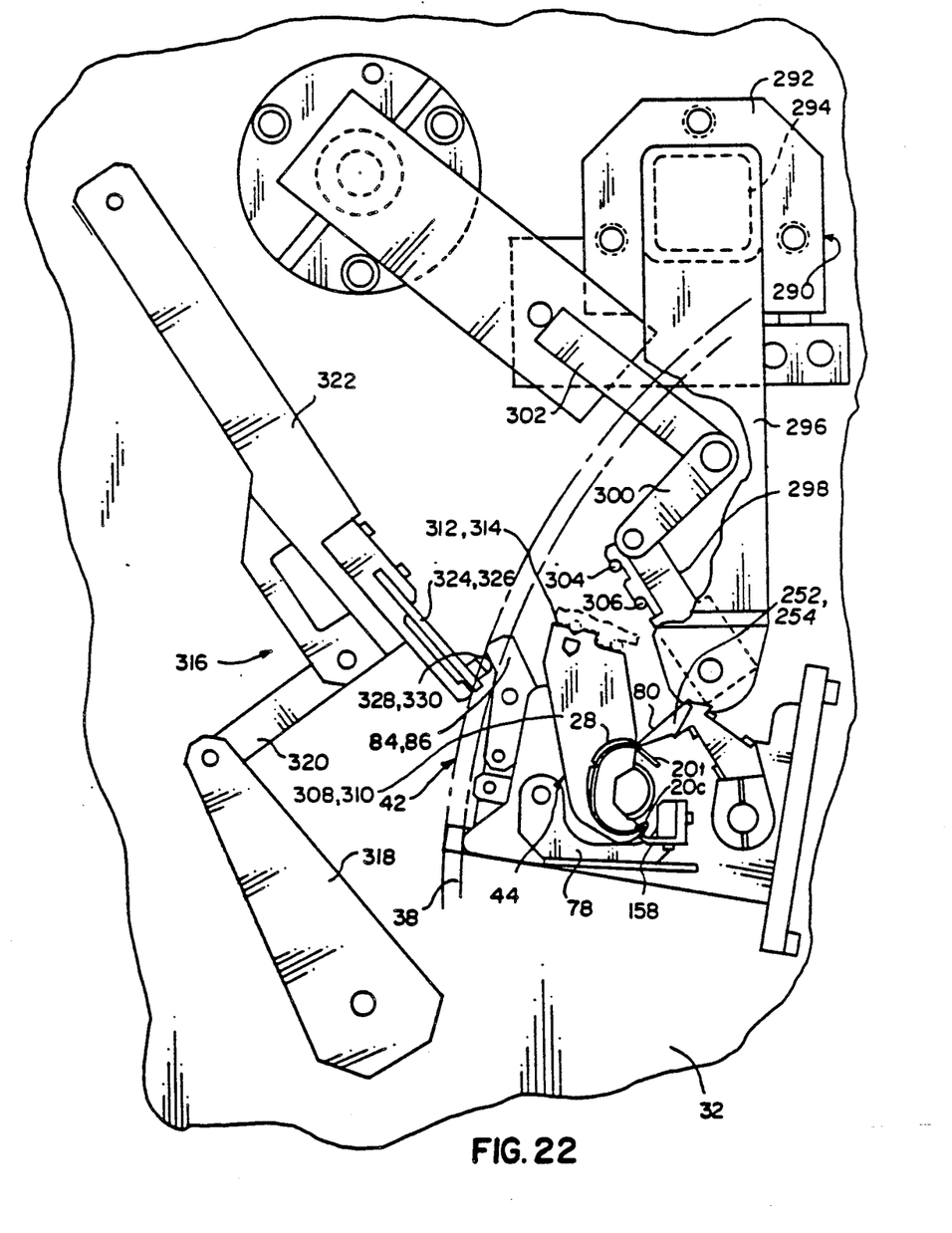
FIG. 22 shows a fragmentary front elevation view of the mechanism of FIG. 4 after the forming dial has been rotated 180 degrees counterclockwise, illustrating the cooperation between the mandrel and a device which removes the very open shell from the mandrel.

FIG. 22 shows a front elevation view of shell removal station 42. As mandrel carrier 36 is indexed into the illustrated position, it passes behind a portion of support structure 290 which is attached to face plate 32 by means of an adaptor plate 292. Extending out of the plane of the figure from plate 292 is an arm 294, illustrated in phantom, from which depends a further arm 296. Thus, mandrel carrier 36 passes between face plate 32 and arm 296 to reach the illustrated position. The lower end of arm 296 pivotably supports a reference datum arm 298 whose opposite end is pivotally attached to a link 300 which in turn is pivotably attached to a crank arm 302 pivotably mounted to face plate 32. When crank arm 302 is rotated clockwise by a conventional oscillator, not illustrated, datum arm 298 moves to the position illustrated in phantom. Datum arm 298 includes on its under side a pair of transversely extending positioning bars 304,306 which in the phantom position provide a reference or docking location for shell removal mechanism 44, the end portion of which is illustrated in FIGS. 20 to 22 and 24 22. Mechanism 44 suitably comprises a pair of spaced claws 308,310, only the outermost one of which is visible in FIG. 22, which are moved to the illustrated position just before mandrel carrier 36 arrives. The openings of claws 308,310 are sized so that when mandrel carrier 36 is moved outwardly by mechanism 274, mandrel 76 and very open shell 28 move through the openings in claws 308,310 while lips 20c,20t remain outside the openings and held against the mandrel by hook 158 and clamping fingers 252,254, respectively. Along their edges remote from such openings, claws 308,310 include reference edges 312,314, only the outermost one of which is visible in FIG. 22. Just before claws 308,310 are moved to the illustrated position, datum arm 298 is moved to the illustrated phantom position. Positioning bars 304,306 are thus located so that reference edges 312,314 will contact them and accurately position claws 308,310 to allow mandrel 76 and very open shell 28 to enter.

Once mandrel 76 and very open shell 28 have been positioned within the openings of claws 308,310, hook 158 and clamping fingers 252,254 must be released to permit the shell to spring into the openings of the claws for subsequent removal from mandrel 76. For this purpose, a toggle release mechanism 316 is provided which in one embodiment may comprise a crank arm 318 rotatably mounted to face plate 32, a link arm 320 pivotably connected to the outer end of crank arm 318 and a release arm 322 pivotably connected near one end to link arm 320 and pivotably mounted at the other end to face plate 32. Crank arm 318 may be driven by a conventional oscillator, not illustrated. At its free end, release arm 322 supports a pair 324, 326 of stiff leaf springs having toggle release buttons 328,330 located on their outer ends, only the outermost leaf spring and release button being visible in FIG. 22. When release buttons 328,330 are pressed against the free ends of trip arms 142 and 172 of mandrel carrier 36, toggle mechanisms 84,86 are released and very open shell 28 springs into the embrace of the openings in claws 308,310.

Figure 23:
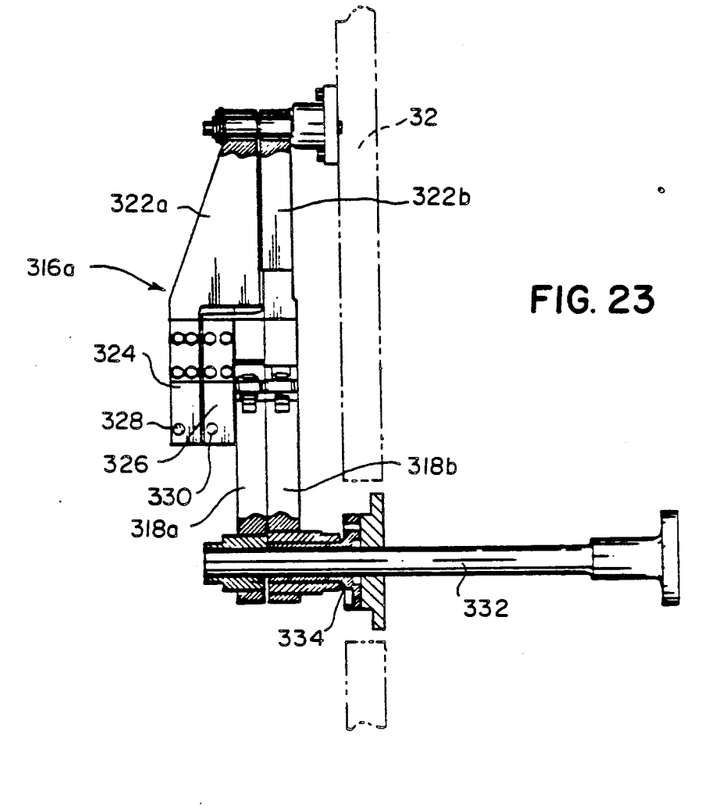
FIG. 23 shows a side elevation view, partially in section of the mechanism for releasing the clamps holding the shell against the mandrel in FIG. 22.
Figure 24:
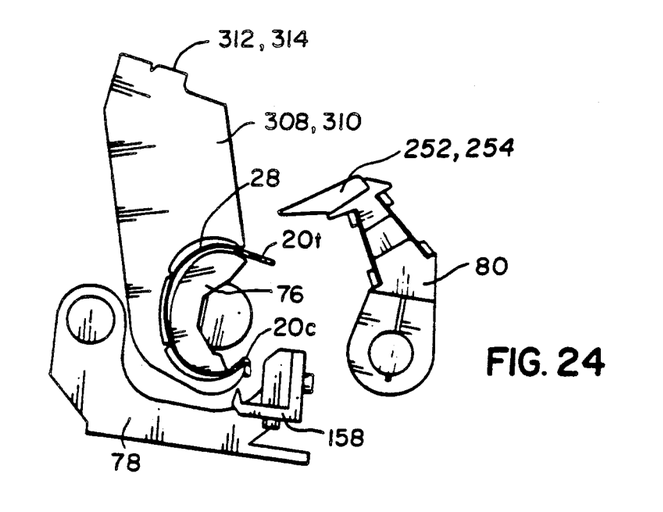
FIG. 24 shows an enlarged fragmentary front elevation view of the mandrel within the means for removing after release of the clamps, illustrating how the shell springs open into the means for removing.

In a toggle release mechanism as just described, release buttons 328,330 would tend to release toggle mechanisms 84,86 simultaneously; so that lips 20c,20t would spring away from mandrel 76 into engagement with claws 308,310. It is preferred, however, that lip 20c be released first since its crimp tends to engage one lip of claws 308,310 and thereby guide the rest of very open shell 28 into proper engagement with the claws, after lip 20t has been released. To achieve this sequence of release, the toggle release mechanism 316a of FIG. 23 is preferred. In this instance, a first crank arm 318a is mounted for rotation with a shaft 332 extending outwardly through face plate 32 and a second crank arm 318b is mounted on a tubular shaft 334 concentric with shaft 332, thus permitting the crank arms to be independently actuated by a conventional oscillator, not illustrated, acting on shafts 332 and 334. Crank arms 318a and 318b are pivotably connected to links not visible in FIG. 23 but identical in function to link 320, which links are pivotably connected to release arms 322a,322b. Thus, by rotating shaft 332 before shaft 334, release arm 322a is rotated to press release button 328 against the free end of trip arm 142 and release clamping arm 78 just before release arm 322b is rotated to press release button 330 against the free end of trip arm 172 and release clamping arm 80. FIG. 24 shows a fragmentary view of the structure of FIG. 22 after clamping arms 78,80 have been released and very open shell 28 has sprung away from mandrel 76 into engagement with claws 308,310.

Though our invention has been described with regard to the forming of a single very open shell, those skilled in the art will understand from the disclosure that the mechanisms of the forming dial are capable, in cooperation with the blank feeding mechanism, of sequentially forming a plurality of very open shells, with various shells being in different states of completion at any one time. The synchronization of the mechanisms to achieve such operation is well within the skill of those in the mechanical arts.

While our invention has been shown and described with reference to particular embodiments thereof, those skilled in the art will understand that various modifications in form and detail of the apparatus and method may be made without departing from the scope and spirit of our invention.

Having thus described our invention in sufficient detail to enable those skilled in the art to make and use it, we claim as new and desire to secure Letters Patent for:

1. Apparatus for forming a very open shell for a substantially cylindrical magazine for prewound spools of a strip of material, comprising:

a source of substantially rectangular metal blanks for the side walls of such substantially cylindrical magazines, each said blank having an opposed pair of axially extending lips and an opposed pair of end edges;

mandrel means for forming each of said blanks, said mandrel means having a circumferentially extending convex exterior surface against which each of said blanks is formed between said lips, said exterior surface terminating in two edges near which said lips of each of said blanks are positioned during forming with said exterior surface being entirely convex between said edges of said mandrel, said exterior surface having a circumferentially changing radius of curvature, said radius of curvature decreasing from about the midpoint of said exterior surface in each direction to said edges on said exterior surface which during forming are contacted by said blank near said lips, said midpoint being located on said exterior surface at a point about equally spaced from said two edges where said lips contact said exterior surface, said exterior surface being configured so that each of said blanks, formed around said mandrel means against said exterior surface from near one of said lips to near the other, springs upon removal from said exterior surface to a very open shell form in which said lips are spaced sufficiently far apart to permit such a prewound spool to pass laterally between said lips; and means for pressing each of said blanks into contact with said exterior surface of said mandrel means from near one of said lips to near the other.

2. Apparatus for forming a very open shell for a substantially cylindrical magazine for prewound spools of a strip of material, comprising:

a source of substantially rectangular metal blanks for the side walls of such substantially cylindrical magazines, each said blank having an opposed pair of axially extending lips and an opposed pair of end edges;

mandrel means for forming each of said blanks, said mandrel means having a circumferentially extending exterior surface against which each of said blanks is formed, said exterior surface having a circumferentially changing radius of curvature, and being configured so that each of said blanks, formed around said mandrel means against said exterior surface from near one of said lips to near the other, springs upon removal from said exterior surface to a very open shell form in which said lips are spaced sufficiently far apart to permit such a prewound spool to pass laterally between said lips;

means for pressing each of said blanks into contact with said exterior surface of said mandrel means from near one of said lips to near the other;

at least one frame for supporting said mandrel means;

means for positioning each of said metal blanks on said mandrel means prior to forming;

first means mounted on said frame for clamping one of said lips to said mandrel prior to forming;

roller means for contacting said metal blank near said one clamped lip;

means for moving said roller means about said mandrel means to roll form said metal blank; and second means mounted on said frame for clamping the other of said lips to said mandrel after roll forming.

3. Apparatus according to claim 2, wherein said second means for clamping comprises:

an arm pivotably mounted at a first end on said frame;

at least one clamping finger for engaging the other of said lips; and a pair of leaf springs connecting a second end of said arm to said at least one clamping finger, said leaf springs being canted toward each other in the direction from said arm to said at least one clamping finger, to permit said at least one clamping finger to rotate relative to said arm upon contact with the other of said lips.

4. Apparatus according to claim 2, further comprising;

a rotatable dial having an axis of rotation;

means for moving said at least one frame parallel to said axis of rotation, at a position of said dial at which said mandrel means is accessible for removal of said blank after roll forming.

5. Apparatus according to claim 4, further comprising:

means at said position for releasing said first and second means for clamping to facilitate removal of said blank from said mandrel means.

6. Apparatus according to claim 4, further comprising;

a circular guide rail fixedly positioned concentric with said axis of rotation and in proximity to said rotatable dial, said guide rail having a circumferentially extending gap at said second position;

at least one guide roller mounted on said frame and engaged with said guide rail;

and said means for moving said at least one frame comprises:

means connected between said rotatable dial and said frame for permitting said frame to move essentially parallel to the direction of said axis of rotation; and means for grasping said guide roller when said guide roller is positioned at said circumferentially extending gap, for moving said frame to a location at which said mandrel means is accessible for removal of said blank, for returning said frame to its former position and for releasing said guide roller.

7. Apparatus according to claim 2, further comprising means for resiliently biasing said roller means into contact with said metal blank, whereby said blank is pressed against said exterior surface of said mandrel means as said roller means moves about said mandrel means.

* * * * *